United States Patent [19]

Torres

[11] 4,019,624
[45] Apr. 26, 1977

[54] DEVICE FOR INTERMITTENTLY RECEIVING AND CONTINUOUSLY DELIVERING OBJECTS

[75] Inventor: Jean Torres, Lausanne, Switzerland

[73] Assignee: SAPAL Societe Anonyme des Plieuses Automatiques, Switzerland

[22] Filed: Oct. 7, 1975

[21] Appl. No.: 620,325

[30] Foreign Application Priority Data

Dec. 19, 1974 Switzerland ............... 16944/74

[52] U.S. Cl. ........................... 198/459; 198/577; 198/728; 198/792

[51] Int. Cl.² ........................ B65G 47/26

[58] Field of Search ............ 198/34, 76, 110, 172, 198/208, 459, 461, 577, 792, 728

[56] References Cited

UNITED STATES PATENTS

| 2,514,293 | 7/1950 | Rumsey | 198/208 X |
|---|---|---|---|
| 3,190,434 | 6/1965 | Dardaine | 198/76 X |

FOREIGN PATENTS OR APPLICATIONS

| 653,434 | 5/1951 | United Kingdom | 198/110 |

Primary Examiner—Evon C. Blunk
Assistant Examiner—Douglas D. Watts
Attorney, Agent, or Firm—Stevens, Davis, Miller & Mosher

[57] ABSTRACT

An endless chain passing about a constantly rotating driving wheel and a chain-tensioning driven wheel carries alternately-disposed first and second rollers, with object-driving fingers on the first rollers. Along the upper run of the chain is a fixed ramp having a lower rolling track for the first rollers and an upper rolling track for the second rollers whereby the chain is accordion-folded at a location corresponding to a zone on a table for intermittently receiving objects to be delivered between the fingers. After the fixed ramp is a vertically-reciprocating mobile ramp which produces an intermittent stopping of the fingers in said zone, while allowing the objects taken-up to leave the table with the chain unfolded and hence with a regular pitch and at constant speed.

2 Claims, 4 Drawing Figures

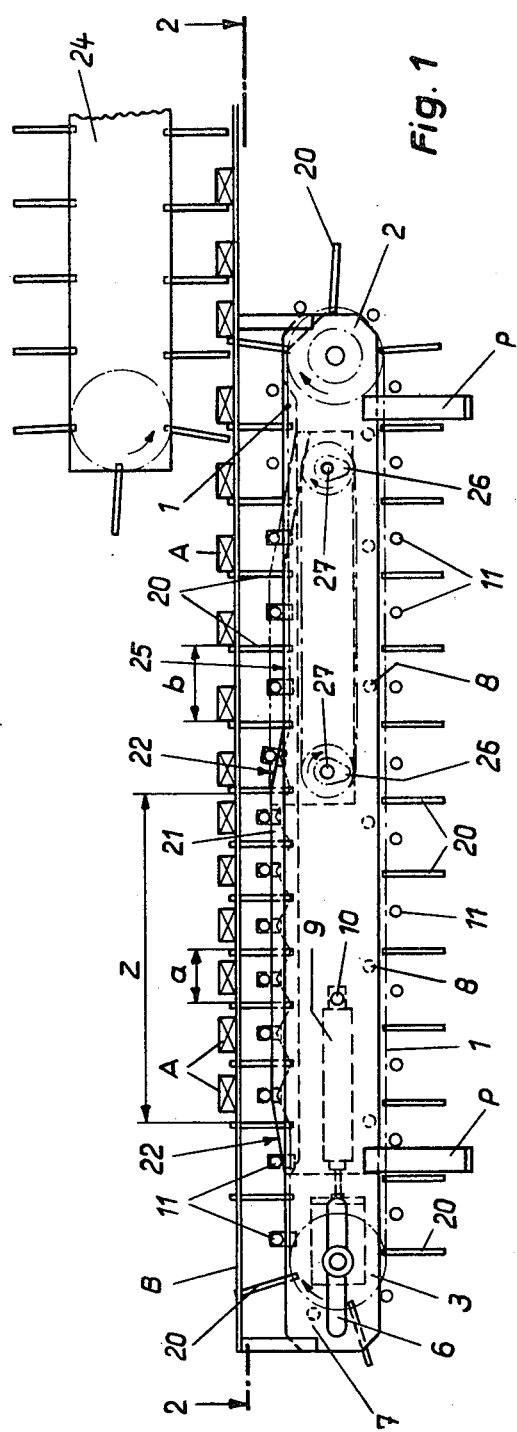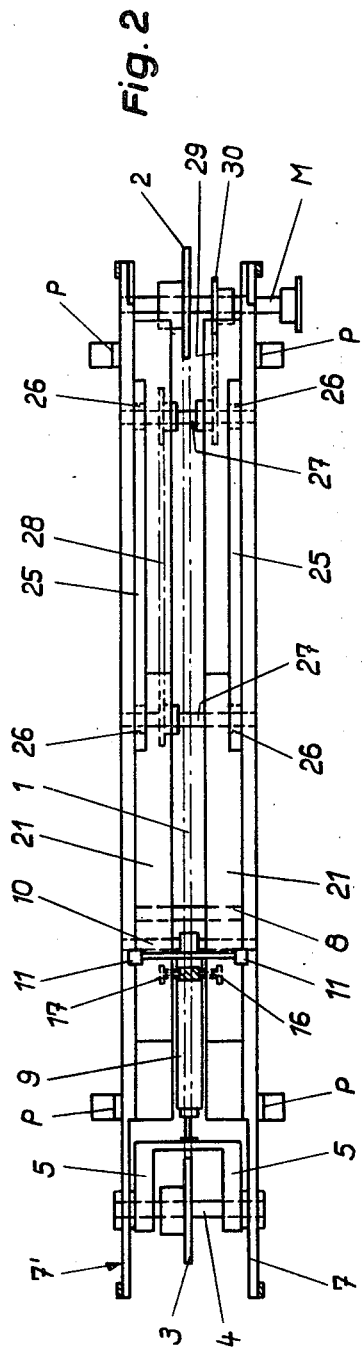

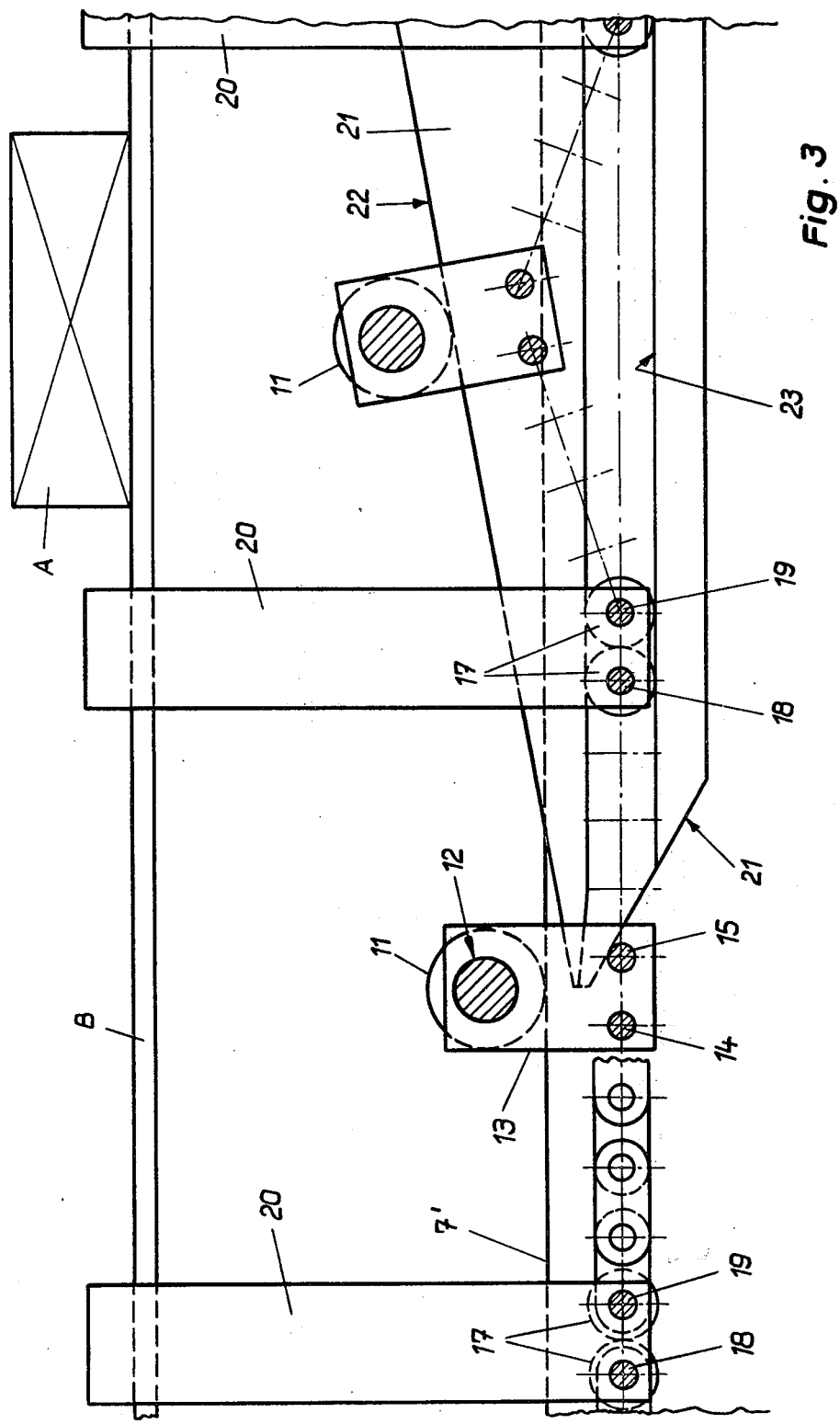

DEVICE FOR INTERMITTENTLY RECEIVING AND CONTINUOUSLY DELIVERING OBJECTS

The invention relates to devices for intermittently receiving series of objects, such as wrapped or non-wrapped products coming from a production machine, in delivery line and continuously delivering them to a wrapping or other machine, of the type comprising an endless chain mounted on a driving wheel driven at constant speed and a driven wheel mounted to exert a uniform tension on the chain.

In known devices of this type, the endless chain passes about idler wheels or pinions arranged to form a loop shortening the remainder of the endless chain. These idler pinions are in general mounted on displaceable supports so as to permit modification of the length of the loop and hence the speed of movement of the strand of the chain downstream of the loop; of course, means are provided to permit the driven chainwheel to follow variations of the endless chain. These known devices are relatively complicated and have the drawback of not having a regular output pitch at a uniform speed.

The invention aims to remedy this disadvantage by providing a device of the mentioned type with a fixed ramp disposed along a part of a run of the chain and having an upper rolling track and a lower rolling track, first and second rollers fixed alternately to the chain, fingers carried by the chain at positions corresponding to the first or second rollers for driving said objects along a table, the first rollers moving on the lower rolling track and the second rollers moving on the upper rolling track to fold the chain in the manner of an accordion along the fixed ramp where the speed of the chain is intermittently reduced or cancelled in a zone of the table for intermittently receiving objects, and means for unfolding the chain at the outlet end of the fixed ramp whereby the driving fingers once more move at the same speed as the extended chain and with a regular output pitch.

The accompanying drawings show, by way of example, an embodiment of a device according to the invention. In the drawings:

FIG. 1 is an overall side elevational view of the device;

FIG. 2 is a schematic plan view thereof; and

FIGS. 3 and 4 are enlarged-scale views of a part of FIGS. 1 and 2 respectively.

Figure 4:
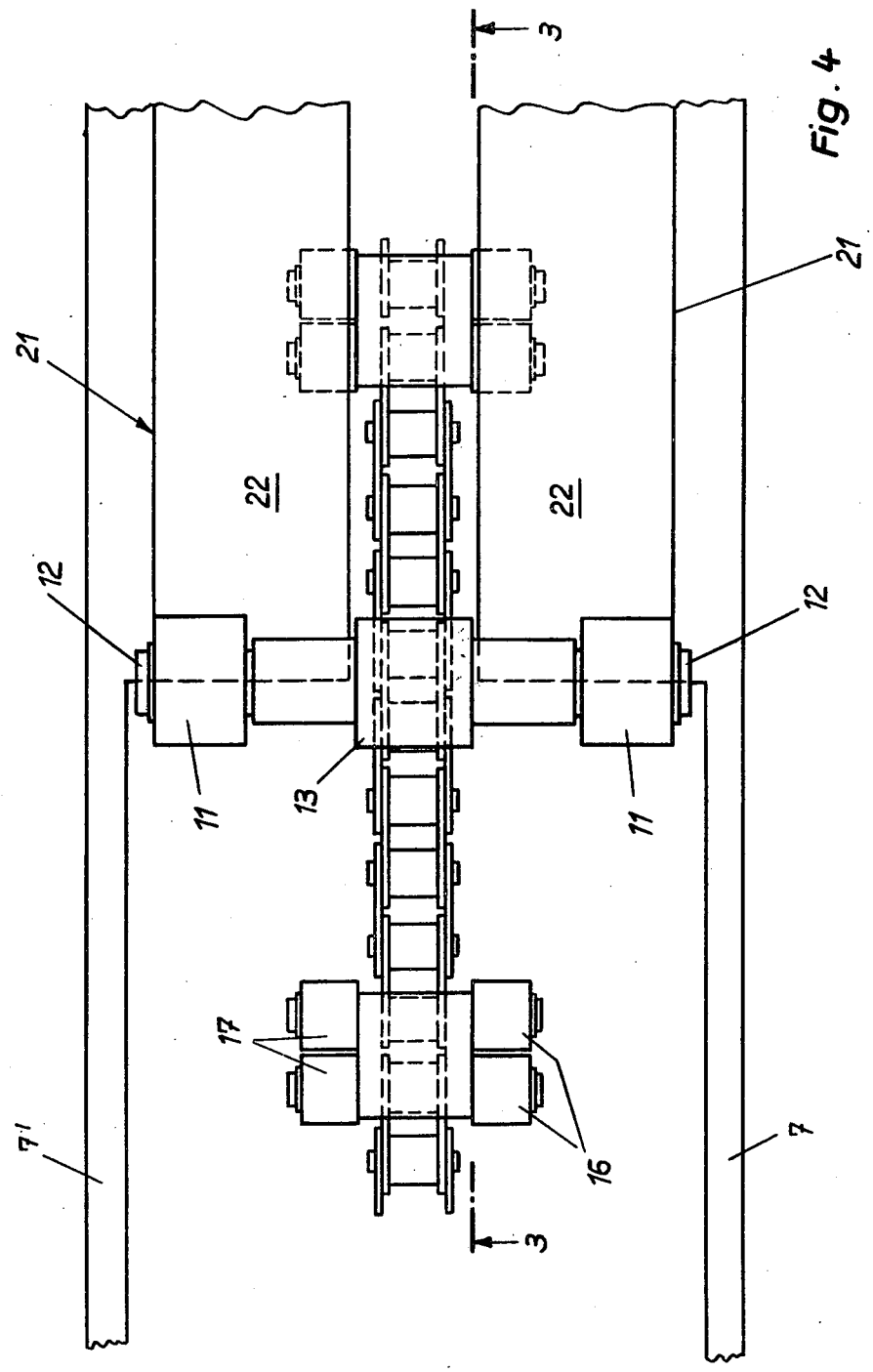

The device shown serves to deliver intermittently-introduced objects A along a delivery line on a table B fixed to the frame of the device. The objects may be bars of chocolate or other wrapped or non-wrapped products coming from a moulding or folding machine, not shown. The device comprises an endless chain 1 passing about a driving wheel 2 mounted on a driving shaft M driven at constant speed, and about a driven wheel 3. The driven wheel 3 is freely mounted on a shaft 4 carried by a yoke 5 and sliding in slots 6 in lateral walls 7, 7' forming part of the frame of the device. These walls 7, 7' are held spaced apart by six lower cross-pieces 8 (Fig. 1), only one of which is shown in FIG. 2, and by an upper spacer formed by a fixed ramp 21. The frame of the device is supported on feet P.

Yoke 5 is connected to a tightener 9 hooked on a transverse axle 10 fixed between the lateral walls 7, 7'. Tightener 9 is pneumatically, hydraulically or mechanically controlled to maintain a uniform tension in the chain 1 between the driving wheel 2 and driven wheel 3.

The chain 1 carries rollers 11 mounted in pairs on transverse axles 12 extending on either side of chain 1, each axle 12 being carried by a support 13 fixed on pins 14 and 15 of a link of the chain 1. These rollers 11 are thus disposed at a certain distance above and on either side of the upper run of chain 1. The chain 1 also carries on either side pairs of rollers 16, 17 whose axles 18, 19 coincide with the pins of a link of chain 1. Driving pallets or fingers 20 are mounted on axles 18 and 19 between the pairs of rollers 16 and 17 and serve to push objects A along table B when they come into contact with the objects.

The pairs of rollers 16, 17 and supports 13 of rollers 11 are equidistantly and alternately spaced apart along chain 1.

A fixed ramp 21, having an upper rolling track 22 for the rollers 11 and a lower rolling track 23 for the rollers 16, 17, is mounted between the driving and driven wheels 2, 3 along the upper run of endless chain 1. The upper rolling track 22 has a first upwardly-inclined inlet part, a horizontal part corresponding to a filling or receiving zone Z on the table B, and a third downwardly-inclined outlet part symmetrical to the first inlet part. This outlet part need not necessarily by symmetrical to the inlet part.

The lower rolling track 23 is horizontal and in the same plane as the axles of rollers 16 and 17 which are guided thereby.

Objects A arriving at the outlet end of table B are taken up by an endless-chain driving device 24.

A pair of mobile plates 25 forming a ramp are mounted on either side of the chain 1 at the outlet end of the upper rolling track 22 of fixed ramp 21. This mobile ramp 25 is reciprocated vertically in synchronization with the drive of chain 1 by cams or eccentrics 26 mounted on shafts 27 driven by chains 28, 29 by a wheel 30 on the axle M of driving wheel 2.

Operation of the described device is as follows:

When the endless chain 1 is driven by rotation of the driving wheel 2 in the direction of the arrow (FIG. 1), the rollers 11 of the upper run of chain 1 which do not touch the upper horizontal edge of walls 7, 7' pass onto the upwardly-inclined part of the rolling track 22 of fixed ramp 21. The following rollers 16 and 17 engage in the horizontal lower rolling track 23 so that the chain 1 is folded in zig-zag formation in the manner of an accordion, as shown in FIGS. 1 and 3.

At the outlet end of the rolling track 22 of fixed ramp 21, the rollers 11 pass onto the mobile ramp 25 which at a given moment moves vertically down. The result of this downward movement is to reduce the angle of inclination of the inclined segments of the chain and consequently to increase the distance corresponding to the projection of these segments of the chain. The speed of the part of chain 1 on the fixed ramp 21 behind the rollers 11 lowered by the mobile ramp 25 may thus be momentaneously reduced, cancelled or even reversed, i.e., the driving fingers 20 can be momentaneously slowed, stopped or reversed in the filling or receiving zone Z. This enables the delivery or insertion of objects A between the fingers 20 at rest or low speed and spaced apart by a distance $a$ as shown in FIG. 1, and to deliver them at a uniform speed with a regular pitch $b$.

When the mobile ramp 25 moves back up to the upper position, the rollers 11 supported by this ramp 25 are similarly placed to those on the fixed ramp 22 and the driving fingers 20 start moving again, distance $b$ thus being made equal to distance $a$. In the lowered position $b > a$. By its downward movement, the mobile ramp 25 thus unfolds the chain 1 and increases the pitch between the fingers 20 in relation to the pitch $a$ in the zone Z whence $b > a$. Ramp 25 thus provides a modulation of the effective chain length in synchronization with drive of the chain 1, this modulation being compensated by a reciprocation of the driven wheel 3 maintaining the chain tension constant and by an intermittent stopping (or slowing) and starting of the driving fingers 20 in zone Z.

Instead of being controlled by cams or eccentrics, the vertical reciprocation of mobile ramp 25 could be controlled externally (e.g. by a device intermittently feeding objects to zone Z) by mechanically, pneumatically, hydraulically or electrically actuated levers.

In the described device, the length of chain in zone Z is such that it is necessary to have the mobile ramp 25 for unfolding the chain as described above. When the run of the chain engaged on the fixed ramp is very short, this mobile ramp 25 can be dispensed with. In this case, the means for unfolding the chain at the outlet of the upper rolling track of the fixed ramp are simply formed by the inclination of the fixed outlet ramp of rollers 11.

What is claimed is:

1. A device for continuously delivering to a machine, a series of objects intermittently received, said device comprising in combination an endless chain mounted on a driving wheel driven at constant speed and a driven wheel, said driven wheel being mounted on a sliding yoke fixed to a tensioner constantly tensioning the chain, an upper track and a lower track, first and second rollers fixed alternately to the chain, fingers carried by the chain at positions corresponding to either of the first and second rollers for driving the objects along a table, the first rollers moving on the lower track and the second rollers moving on the upper track to fold the chain in a zig-zag section where the speed of the chain is intermittently reduced or cancelled for receiving the series of objects, a vertically movable track disposed at the end of the zig-zag section at the outlet of the upper track to receive the second rollers leaving said upper track, said vertically movable track being controlled by eccentric means driven in synchronization with the driving wheel to produce a vertical reciprocating movement of the vertically movable track, whereby the fingers may once more move at the same speed as the extended chain and with a uniform output pitch.

2. A device for continuously delivering to a machine, a series of objects received intermittently, said device comprising an endless chain mounted on a driving wheel driven at constant speed and a driven wheel, an upper track and a lower track, first and second rollers fixed alternately to the chain, fingers carried by the chain at positions corresponding to either of the first and second rollers for driving the objects along a table, the first rollers moving on the lower track and the second rollers moving on the upper track to fold the chain in a zig-zag section where the speed of the chain is intermittently reduced or cancelled for receiving the series of objects, a reciprocatingly vertically movable track disposed at the end of the zig-zag section at the outlet of the upper track to receive the second rollers leaving said upper track, and means for vertically reciprocatingly moving said movable track, whereby the fingers may once more move at the same speed as the extended chain and with a uniform output pitch.

* * * * *